US009962896B2

(12) United States Patent
Davis et al.

(10) Patent No.: US 9,962,896 B2
(45) Date of Patent: May 8, 2018

(54) PEELABLE SEALS INCLUDING POROUS INSERTS

(71) Applicant: FENWAL, INC., Lake Zurich, IL (US)

(72) Inventors: Shawn Davis, Bristol, WI (US); Mark B. Jones, Ann Arbor, MI (US)

(73) Assignee: Fenwal, Inc., Lake Zurich, IL (US)

(*) Notice: Subject to any disclaimer, the term of this patent is extended or adjusted under 35 U.S.C. 154(b) by 877 days.

(21) Appl. No.: 14/513,369

(22) Filed: Oct. 14, 2014

(65) Prior Publication Data

US 2015/0031518 A1    Jan. 29, 2015

Related U.S. Application Data

(62) Division of application No. 12/391,882, filed on Feb. 24, 2009, now abandoned.
(Continued)

(51) Int. Cl.
*A61M 5/32* (2006.01)
*A61M 37/00* (2006.01)
(Continued)

(52) U.S. Cl.
CPC .................... *B31B 1/60* (2013.01); *A61J 1/10* (2013.01); *B29C 65/04* (2013.01); *B29C 65/18* (2013.01);
(Continued)

(58) Field of Classification Search
CPC ......... B29C 65/00; B29C 65/02; B29C 65/14; B29C 65/1425; B29C 65/76; B29C 66/00; B29C 66/05; B29C 66/21; B29C 66/242; B29C 66/2424; B29C 66/24244; B29C 66/303; B29C 66/3034; B29C 66/30341; B29C 66/304; B29C 66/43; B29C 66/432; B29C 66/4326; B29C 66/433; B29C 66/729; A61J 1/2024; A61J 1/2093; A61J 1/10; B65D 81/3266; B29L 2031/7148; B32B 27/08; B32B 27/12; B32B 37/0084; B32B 37/04; B32B 37/065; B32B 2439/80
USPC ........... 156/60, 69, 145, 155, 247, 250, 254, 156/272.2, 273.7, 275.1, 289, 290, 292, 156/308.2, 308.4, 309.6, 701, 714, 719; 604/410, 416, 408, 87, 88, 89; 206/219,
(Continued)

(56) References Cited

U.S. PATENT DOCUMENTS 3,074,544 A * 1/1963 Bollmeier ............... B29C 65/76
206/219
4,087,577 A 5/1978 Hendrickson
(Continued)

FOREIGN PATENT DOCUMENTS

EP    0295204    12/1988
EP    0399549    11/1990
(Continued)

*Primary Examiner* — Philip C Tucker
*Assistant Examiner* — Brian R Slawski
(74) *Attorney, Agent, or Firm* — Cook Alex Ltd.

(57) ABSTRACT

Peelable seals including porous inserts are described. An example peelable seal includes a porous insert positioned between a first sheet and a second sheet. The porous insert includes a plurality of interwoven strands and a plurality of pores adjacent the interwoven strands through which a bond is formed between the first sheet and the second sheet when heat is applied to at least one of the first sheet, the second sheet or the porous insert.

6 Claims, 4 Drawing Sheets

Related U.S. Application Data

(60) Provisional application No. 61/031,789, filed on Feb. 27, 2008.

(51) Int. Cl.

| | | |
|---|---|---|
| *A63B 39/00* | (2006.01) | |
| *A63B 41/00* | (2006.01) | |
| *B29C 65/00* | (2006.01) | |
| *B29C 63/00* | (2006.01) | |
| *B32B 37/00* | (2006.01) | |
| *B32B 38/10* | (2006.01) | |
| *B32B 38/04* | (2006.01) | |
| *B65B 7/00* | (2006.01) | |
| *B65D 25/08* | (2006.01) | |
| *C08J 5/00* | (2006.01) | |
| *B31B 1/60* | (2006.01) | |
| *B29C 65/04* | (2006.01) | |
| *B29C 65/18* | (2006.01) | |
| *B29C 65/76* | (2006.01) | |
| *B32B 7/06* | (2006.01) | |
| *B65D 81/32* | (2006.01) | |
| *B32B 27/30* | (2006.01) | |
| *B32B 27/32* | (2006.01) | |
| *A61J 1/10* | (2006.01) | |
| *B31B 50/60* | (2017.01) | |
| *B29K 23/00* | (2006.01) | |
| *B29K 25/00* | (2006.01) | |
| *B29K 27/06* | (2006.01) | |
| *B29K 67/00* | (2006.01) | |
| *B29K 77/00* | (2006.01) | |
| *B29K 105/04* | (2006.01) | |
| *B29K 105/08* | (2006.01) | |
| *B29K 105/20* | (2006.01) | |
| *B29K 267/00* | (2006.01) | |
| *B29L 9/00* | (2006.01) | |
| *B29L 31/00* | (2006.01) | |
| *A61J 1/20* | (2006.01) | |
| *B31B 70/00* | (2017.01) | |

(52) U.S. Cl.
CPC .......... *B29C 65/76* (2013.01); *B29C 66/1122* (2013.01); *B29C 66/3452* (2013.01); *B29C 66/43* (2013.01); *B29C 66/723* (2013.01); *B29C 66/73115* (2013.01); *B29C 66/73116* (2013.01); *B31B 50/60* (2017.08); *B32B 7/06* (2013.01); *B32B 27/302* (2013.01); *B32B 27/306* (2013.01); *B32B 27/32* (2013.01); *B65D 81/3266* (2013.01); *A61J 1/2024* (2015.05); *B29C 66/71* (2013.01); *B29C 66/727* (2013.01); *B29C 66/7234* (2013.01); *B29K 2023/00* (2013.01); *B29K 2023/083* (2013.01); *B29K 2025/00* (2013.01); *B29K 2027/06* (2013.01); *B29K 2067/00* (2013.01); *B29K 2077/00* (2013.01); *B29K 2105/04* (2013.01); *B29K 2105/0845* (2013.01); *B29K 2105/206* (2013.01); *B29K 2267/00* (2013.01); *B29L 2009/00* (2013.01); *B29L 2031/7148* (2013.01); *B31B 70/004* (2017.08); *B32B 2307/31* (2013.01); *B32B 2307/748* (2013.01); *B32B 2439/40* (2013.01); *B32B 2439/80* (2013.01); *Y10T 428/13* (2015.01); *Y10T 442/102* (2015.04)

(58) Field of Classification Search
USPC .......... 206/222, 828; 383/38, 200, 207, 210, 383/211
See application file for complete search history.

(56) References Cited

U.S. PATENT DOCUMENTS

| | | | |
|---|---|---|---|
| 4,770,295 A | 9/1988 | Carveth et al. | |
| 4,997,083 A | 3/1991 | Loretti et al. | |
| 5,176,634 A | 1/1993 | Smith et al. | |
| 5,211,643 A | 5/1993 | Reinhardt et al. | |
| 5,536,469 A | 7/1996 | Jonsson et al. | |
| 5,577,369 A | 11/1996 | Becker et al. | |
| 5,767,123 A | 6/1998 | Yoshida et al. | |
| 5,944,709 A | 8/1999 | Barney et al. | |
| 5,954,230 A * | 9/1999 | Blette | B05B 11/0043 206/219 |
| 6,017,598 A | 1/2000 | Kreischer et al. | |
| 6,039,719 A | 3/2000 | Wieslander et al. | |
| 6,039,720 A | 3/2000 | Wieslander | |
| 6,241,943 B1 | 6/2001 | Wieslander et al. | |
| 6,309,673 B1 | 10/2001 | Duponchelle et al. | |
| 6,426,056 B2 | 7/2002 | Taylor | |
| 6,468,259 B1 | 10/2002 | Loretti et al. | |
| 6,475,529 B2 | 11/2002 | Duponchelle et al. | |
| 6,645,191 B1 | 11/2003 | Knerr et al. | |
| 6,663,743 B1 | 12/2003 | Becker et al. | |
| 6,712,202 B2 | 3/2004 | Muller et al. | |
| 6,713,165 B1 | 3/2004 | Karsten | |
| 7,053,059 B2 | 5/2006 | Zieske et al. | |
| 7,122,210 B2 | 10/2006 | Elisabettini et al. | |
| 7,175,614 B2 | 2/2007 | Gollier et al. | |
| 7,546,918 B2 | 6/2009 | Gollier et al. | |
| 7,658,279 B2 | 2/2010 | Oka et al. | |
| 2001/0000042 A1* | 3/2001 | Inuzuka | A61J 1/2093 604/410 |
| 2007/0080078 A1* | 4/2007 | Hansen | B65D 81/3266 206/219 |
| 2009/0209935 A1 | 8/2009 | Inoue et al. | |
| 2010/0092446 A1 | 4/2010 | Sumiyoshi et al. | |

FOREIGN PATENT DOCUMENTS

| | | |
|---|---|---|
| EP | 0845970 | 1/2000 |
| EP | 0845969 | 11/2000 |
| EP | 1101483 | 5/2001 |
| EP | 0712583 | 7/2001 |
| EP | 0898466 | 12/2001 |
| EP | 1181920 | 2/2002 |
| EP | 0619998 | 8/2002 |
| EP | 1264588 | 12/2002 |
| EP | 0700280 | 8/2003 |
| EP | 1364638 | 11/2003 |
| EP | 0914093 | 2/2004 |
| EP | 1161932 | 2/2004 |
| EP | 1424056 | 6/2004 |
| EP | 1475067 | 11/2004 |
| EP | 0875231 | 12/2004 |
| EP | 1579839 | 9/2005 |
| EP | 1131077 | 9/2006 |
| EP | 2020386 | 2/2009 |
| EP | 2080501 | 7/2009 |
| EP | 1551729 | 9/2009 |
| EP | 2226058 | 9/2010 |
| EP | 1837291 | 12/2010 |
| EP | 2266522 | 12/2010 |
| EP | 1173134 | 5/2011 |
| EP | 2322236 | 5/2011 |
| EP | 2322237 | 5/2011 |
| JP | 3103265 | 4/1991 |
| JP | 7051342 | 2/1995 |
| JP | 7-106755 | 11/1995 |
| JP | 8143459 | 6/1996 |
| JP | 10192365 | 7/1998 |
| JP | 10277132 | 10/1998 |
| JP | 10314275 | 12/1998 |
| JP | 11510413 | 9/1999 |
| JP | 2000504745 | 4/2000 |
| JP | 2000510728 | 8/2000 |
| JP | 2000325428 | 11/2000 |
| JP | 2001187111 | 7/2001 |

(56) References Cited

FOREIGN PATENT DOCUMENTS

| | | |
|---|---|---|
| JP | 2002136571 | 5/2002 |
| JP | 2002370988 | 12/2002 |
| JP | 2002540992 | 12/2002 |
| JP | 2003159310 | 6/2003 |
| JP | 2004000661 | 1/2004 |
| JP | 2004313805 | 11/2004 |
| JP | 2005514174 | 5/2005 |
| JP | 2005218661 | 8/2005 |
| JP | 2005245677 | 9/2005 |
| JP | 2005288022 | 10/2005 |
| JP | 2006502790 | 1/2006 |
| JP | 2006043061 | 2/2006 |
| JP | 2006141857 | 6/2006 |
| JP | 2006239436 | 9/2006 |
| JP | 2007500126 | 1/2007 |
| JP | 2007111560 | 5/2007 |
| JP | 2007130358 | 5/2007 |
| JP | 2007135933 | 6/2007 |
| JP | 2007244660 | 9/2007 |
| JP | 2007252932 | 10/2007 |
| JP | 2007282707 | 11/2007 |
| JP | 2007289643 | 11/2007 |
| JP | 2008029529 | 2/2008 |
| JP | 2008067848 | 3/2008 |
| JP | 2008104534 | 5/2008 |
| JP | 2008237414 | 10/2008 |
| JP | 2008307404 | 12/2008 |
| JP | 2009160266 | 7/2009 |
| JP | 2009195470 | 9/2009 |

* cited by examiner

FIG. 2
FIG. 3
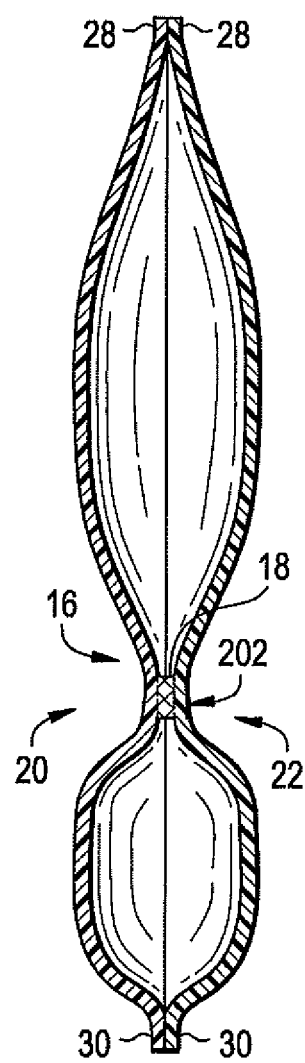
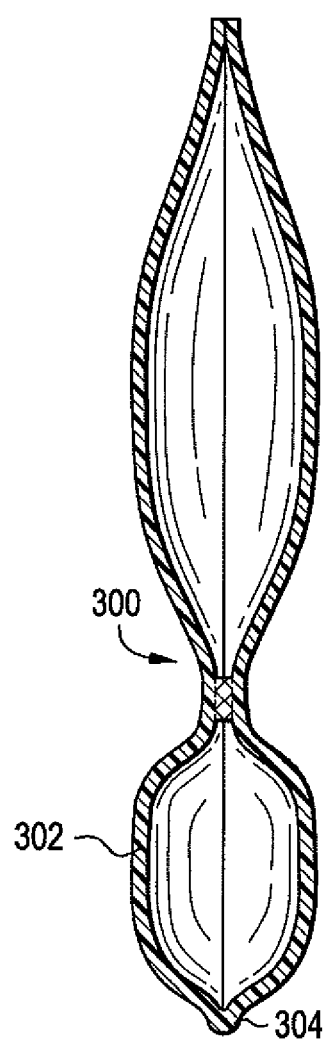

PEELABLE SEALS INCLUDING POROUS INSERTS

RELATED APPLICATION

This patent claims priority to U.S. Provisional Patent Application No. 61/031,789, filed on Feb. 27, 2008, which is hereby incorporated herein by reference in its entirety.

FIELD OF THE DISCLOSURE

The present patent relates generally to peelable seals and, more particularly, to peelable seals including porous inserts.

BACKGROUND

Medical solutions and/or components may be stored in separate containers, which are mixed together prior to use. However, such an approach may compromise the sterility of the system and/or the process and may be relatively labor-intensive, which may lead to inconsistencies and/or mistakes (e.g., dilution of the admixture, formulation mistakes).

Alternatively, flexible containers having multiple compartments separated by peelable or frangible seals may be used in many industries such as, for example, the medical industry to separately store different medical solutions and/or components due, at least in part, to their stability and/or compatibility. These different medical solutions and/or components are admixed before use.

In operation, the peelable seal may be broken by, for example, purposeful manipulation of the flexible container, to mix the separately stored different medical solutions and/or components together. Some known flexible containers are produced and/or fabricated using flexible films or sheets that are joined along their peripheral edges to form the container. To enable the container to have, for example, a first chamber and a second chamber, a peelable seal may be utilized to separate the different chambers. Some flexible containers having multiple compartments are described in U.S. Pat. No. 4,770,295, U.S. Pat. No. 5,176,634 and U.S. Pat. No. 5,577,369, each of which is incorporated herein by reference in their entireties.

Peelable seals are commonly produced by two different methods. One of the methods includes precisely heating adjacent contacting surfaces of single layer sheets to soften or slightly melt the single layer sheets to create cohesive bonds without fully fusing the single layer sheets. Alternately, adjacent layers of multilayer polymeric flexible sheets may be precisely heated to soften or slightly melt the multilayer polymeric flexible sheets to create cohesive bonds without fully fusing the adjacent layers. The other of the methods may include precisely heating adjacent contacting surfaces of multilayered sheets that includes layers having different melting characteristics to soften or slightly melt the inner contacting layers to create a cohesive bond without fusing the outer layers, because the outer layers have a relatively higher melting temperature. Peelable seals, as described above, typically break by separating the sheets adjacent the peelable seal (e.g., delaminating at the seal).

The methods described above to produce peelable seals unfortunately produce peelable seals that are inconsistent (e.g., too strong or too weak), because of difficulties surrounding maintaining precise control of the temperature used to create the sealing boundary, especially in larger scale manufacturing processes. As such, some of the peelable seals produced using the above described methods may be too strong to break open after a particular amount of force is applied or too weak not to break open during normal handling and/or accidental dropping.

SUMMARY

An example peelable seal includes a porous insert positioned between a first sheet and a second sheet. The porous insert includes a plurality of interwoven strands and a plurality of pores adjacent the interwoven strands through which a bond is formed between the first sheet and the second sheet when heat is applied to at least one of the first sheet, the second sheet or the porous insert.

An example method of producing a container having a peelable seal includes sealing a first set of corresponding edges of a first sheet and a second sheet. Additionally, the example method includes positioning a mesh insert between the first sheet and the second sheet. The mesh insert includes a plurality of interwoven strands and a plurality of pores adjacent the interwoven strands. Further, the example method includes sealing a second set of corresponding edges of the first sheet and the second sheet to form the container. Further yet, the example method includes applying heat to a portion of the first sheet, the second sheet, and the mesh insert to form a peelable seal between the first sheet and the second sheet.

BRIEF DESCRIPTION OF THE DRAWINGS

FIG. 2 depicts a cross-sectional view taken at line 2-2 of the example container of FIG. 1.

FIG. 3 depicts a cross-sectional view of an alternative container.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to flexible containers having a plurality of compartments, which are separated by frangible or peelable seals. The plurality of compartments may be utilized to separately store fluid(s) and/or solid(s), which may be combined by, for example, purposefully manipulating the flexible container. In particular, the examples described herein relate to peelable seals that include a mesh insert(s), which reduces the temperature control requirements to produce peelable seals having substantially consistent opening characteristics.

Generally, peelable seals may be advantageously utilized to separate compartments of containers, which may separately store two or more products. These two or more products may be mixed or combined by opening the peelable seal. The examples described herein provide relatively reliable opening characteristics between the two compartments with more lenient temperature control requirements to form the peelable seal, which enables the examples described herein to be efficiently mass produced.

Figure 1:
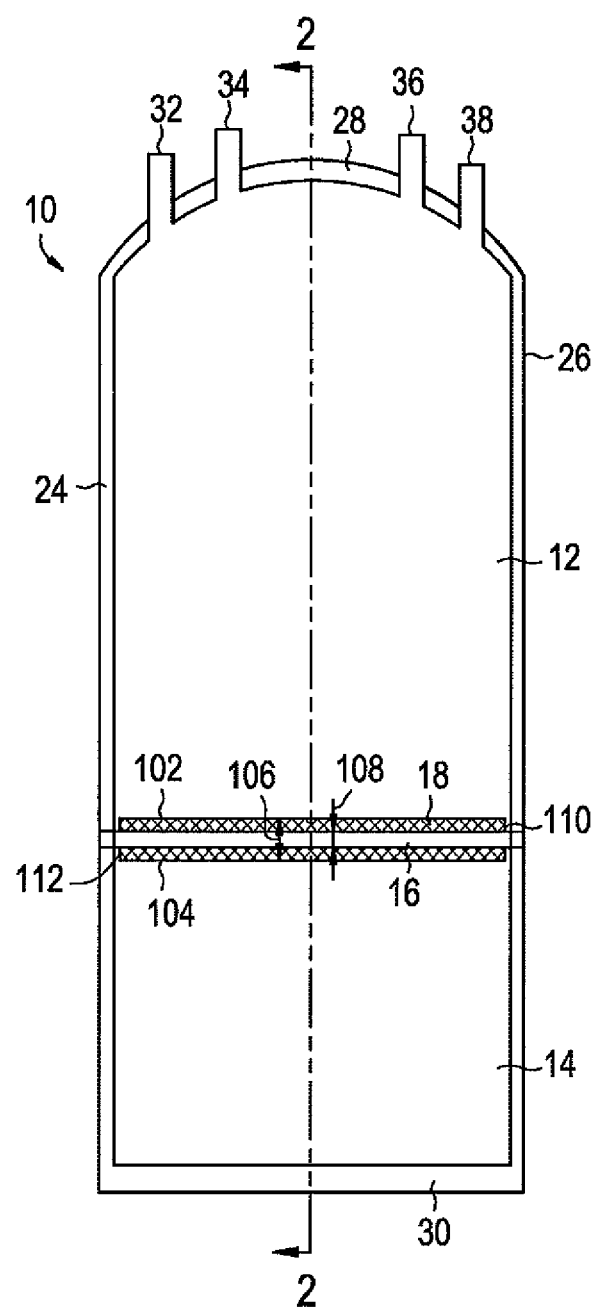
FIG. 1 depicts an example container including an example peelable seal.

FIG. 1 depicts a multiple compartment container 10 (e.g., herein after referred to as the container 10) that includes a first compartment 12 and a second compartment 14 for the separate storage of substances and/or solutions. The container 10 may be formed using a first flexible sheet or first sheet 20 (FIG. 2) and a second flexible sheet or second sheet 22 (FIG. 2) that are heat sealed along first and second longitudinal edges 24 and 26 (e.g., a first set) and first and second lateral edges 28 and 30 (e.g., a second set) to substantially prevent fluid from leaking out between the respective edges 24, 26, 28 and 30. However, typically, a relatively porous material insert, mesh material, insert strip, mesh strip or mesh insert 18 is positioned between first sheet 20 and the second sheet 22 before the first and second longitudinal edges 24 and 26 and/or the first and second lateral edges 28 and 30 are heated sealed. In some examples, the, the first and second longitudinal edges 24 and 26 are heat sealed and then the mesh strip 18 is positioned between the first and second sheets 20 and 22. Next, the first and second lateral edges 28 and 30 are heated sealed. However, the order in which the mesh strip 18 is positioned between the first and second sheets 20 and 22 and/or when the edges 24, 26, 28 and/or 30 are heat sealed may occur in any suitable order. To form a heat seal along the edges 24, 26, 28 and 30, heat may be applied to at least partially melt and fuse the first sheet 20 to the second sheet 22 along the respective edges 24, 26, 28 and 30. The amount of heat applied to melt and fuse the first sheet 20 to the second sheet 22 may vary depending on the type of material that the first and second sheets 20 and 22 are made of. While the above described example describes fusing the edges 24, 26, 28 and 30 of the first and second sheets 20 and 22 together using a heat sealing method, any other method may be used to form a substantially permanent seal between the edges 24, 26, 28 and 30 such as, for example, adhesive bonding. FIG. 3 depicts a cross-sectional view of an alternative container 300, which includes a single flexible sheet 302 (e.g., flexible polymeric sheet) that is folded over itself at an end 304 and, thus, the container 300 includes a single lateral edge 306 that is heat sealed instead of the first and second lateral edges 28 and 30.

Turning back to FIGS. 1 and 2, to separate the container 10 into the first compartment 12 and the second compartment 14, a peelable seal 16 may be positioned between the first and second longitudinal edges 24 and 26. In some examples, the peelable seal 16 includes the mesh strip 18, which is positioned between the first and second sheets 20 and 22. While the container 10 of FIG. 1 includes the peelable seal 16 positioned such that the first compartment 12 is relatively larger than the second compartment 14, the peelable seal 16 may be positioned in any other position relative the first and second sheets 20 and 22 such that the second compartment 14 is approximately the same size or larger than the first compartment 12. Additionally, while the container 10 of FIG. 1 includes the first and second compartments 12 and 14, the container 10 may include any number of compartments (e.g., 1, 2, 3, etc.).

The example container 10 depicted in FIG. 1 includes a first port 32 (e.g., tubular port), a second port 34 (e.g., tubular port), a third port 36 (e.g., tubular port) and a fourth port 38 (e.g., tubular port). The ports 32, 34, 36 and/or 38 enable the first compartment 12 to be fluidly coupled to, for example, another container (not shown). Each of the ports 32, 34, 36 and/or 38 may be designed as an input port, an output port or a combination of an input port and an output port. The container 10 may have any number of ports (e.g., 1, 2, 3, 4, 5, etc.) depending on the particular application. In some examples, the first port 32 may be used to fill the first compartment 12 with a desired fluid, the third and forth ports 36 and 38 may be used to introduce different agents to the fluid and the second port 34 may be used to discharge the fluid. In some examples, the ports 32, 34, 36 and 38 may include a membrane that is pierced by, for example, a cannula or a spike. Although not shown in FIG. 1, the container 10 may have ports (not shown) to communicate with the second compartment 14 or any other compartment that may be included in the container 10.

The container 10 including the peelable seal 16 may be used in a variety of applications and/or industries such as, the medical industry. Generally, the first and second compartments 12 and 14 may include fluids intended for admixture. In some examples, the first compartment 12 may contain blood or a blood component and the second compartment 14 may contain a preservative solution. Specifically, the first compartment 12 may receive red blood cells and the second compartment 14 may contain a red blood cell preservative such as, for example, Adsol® or SAG-M. In other examples, the first compartment 12 may contain blood or a blood component and the second compartment 14 may contain a treating fluid or treating device. Particularly, the first compartment 12 may contain a blood component and the second compartment 14 may include a compound absorption device associated with pathogen inactivation. Generally, the compound absorption device associated with pathogen inactivation may substantially remove pathogen inactivation agents, by-products of a pathogen inactivation treatment or even the pathogens themselves. In operation, to mix the blood component (e.g., pathogen inactivated blood) and the compound absorption device for a predetermined amount of time, an operator may purposefully manipulate the container 10 to fluidly couple the first compartment 12 and the second compartment 14 by opening the peelable seal 16 (e.g., separating the first sheet 20 from the second sheet 22 adjacent the peelable seal 16). Once the predetermined amount of time has lapsed, the operator may evacuate the fluid from the container 10 through the second port 34. In some examples, the container 10 may include an aperture (not shown) to enable the container to be suspended from, for example, a hook of an I.V. stand.

FIG. 2 depicts the first and second sheets 20 and 22 (e.g., plastic sheets) of the container 10 and the peelable seal 16 that includes the mesh strip 18. As shown in FIG. 2, the mesh strip 18 is positioned between the first and second sheets 20 and 22 adjacent a junction 202 between the sheets 20 and 22. The peelable seal 16 substantially prevents the first and second compartments 12 and 14 from being fluidly coupled until the peelable seal 16 is broken and/or opened by, for example, purposefully manipulating the container 10. As discussed above, breaking and/or opening the peelable seal 16 enables fluid contained in the first compartment 12 to be mixed with fluid contained in the second compartment 14.

Figure 4:
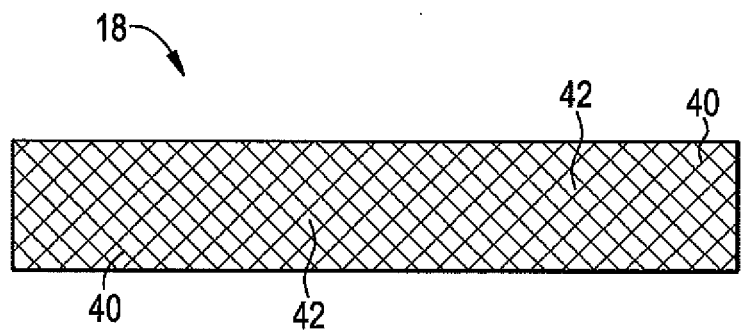
FIG. 4 depicts an example mesh strip utilized to form the peelable seal of FIG. 1.

FIG. 4 depicts a more detailed view of the example mesh strip 18. The mesh strip 18 may include a plurality of interwoven strands 40 between which pores 42 may be defined. The mesh strip 18 may be any suitable size and/or shape (e.g., a mesh shape) and may be made of any suitable material having properties that are compatible with the fluids to be stored in the first compartment 12 and the second compartment 14. Additionally, the mesh strip 18 may be made of any suitable material that has a melting temperature relatively greater than the first and second sheets 20 and 22 of the container 10, which enables the mesh strip 18 to substantially resist fusing with the first and/or second sheets 20 and 22 when the sheets 20 and 22 are heated to form the peelable seal 16.

Generally, the first and/or second sheets 20 and 22 may be made of any suitable material such as, for example, a flexible material, and the first sheet 20 may be made of the same or a different material as the second sheet 22. More specifically, the material used for the first and/or second sheets 20 and 22 may vary depending on the fluids to be stored in the first and/or second compartments 12 and 14. In some examples, the first and second sheets 20 and 22 may each include a single layer plastic sheet. Alternatively, in other examples, the first and second sheets 20 and 22 may each include a multilayer plastic sheet. Additionally, the type of material used for the first and/or second sheets 20 and 22 may depend on the method (e.g., heating method) used to form, for example, the peelable seal 16. Some methods of forming peelable seals include, for example, direct heat sealing and/or RF sealing.

In some examples, the first and second sheets 20 and 22 may be made of a RF-responsive plastic material or RF-responsive resin material to enable RF-welding to be utilized to form the seals along, for example, the edges 24, 26, 28 and 30 of the container 10. Generally, RF-responsive resins are resins that may be heated by RF energy.

In some examples, the first and second sheets 20 and 22 have a thickness between about 1 mil and 10 mils depending on the type of sheets used (e.g., a single plastic sheet or a multilayer plastic sheet). A multilayer sheet may include a plurality of different plastic films adhered to one another to form a single sheet, which has properties not possessed by a single plastic sheet. The first and second sheets 20 and 22 may be made of multilayer sheets if, for example, the fluid to be contained in the first and/or second compartments 12 and/or 14 is only compatible with particular types of materials (e.g., particular types of plastics) and/or the fluid to be contained in the first and/or second compartments 12 and/or 14 requires a material (e.g., plastic) that is substantially impenetrable to air, oxygen and/or moisture.

In other examples, the first and second sheets 20 and 22 (e.g., polymeric sheet) may be a single layer of PVC film having a thickness of between about 3 mils and 18 mils. Typically, PVC film is compatible with whole blood as well as blood products. Additionally, PVC film is RF-responsive (e.g., RF-welding may be utilized to form the seals along, for example, the edges 24, 26, 28 and 30 of the container 10). However, any other suitable material or plastic resin may be utilized to produce the first and/or the second sheets 20 and/or 22 such as, for example, polyolefins, polyamides, polyesters, polybutadiene, styrene and hydrocarbon copolymers and mixtures.

Figure 5:
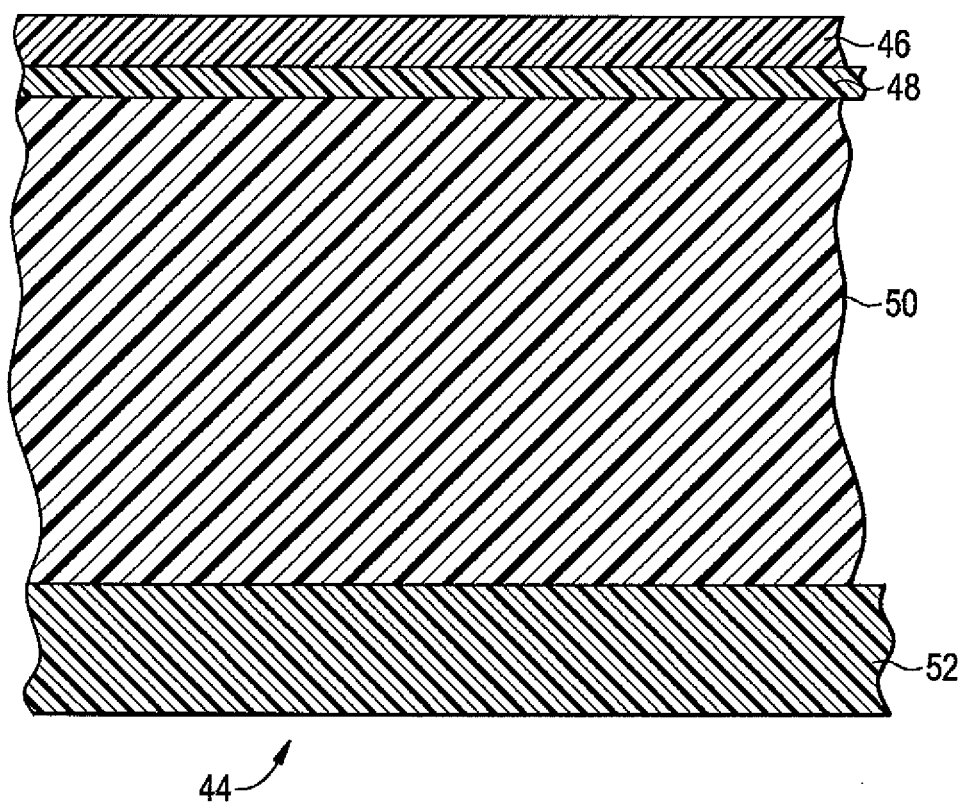
FIG. 5 depicts a cross-sectional view of an example multilayer sheet that may be used to implement the first sheet and/or the second sheet of FIG. 2.

FIG. 5 depicts a multilayer sheet 44 that may be used to implement the first sheet 20 and/or the second sheet 22. The multilayer sheet 4 may include a first layer 46, a tie layer 48, a second layer 50 and a sealing, contacting or inner layer 52. The first layer 46 may be an outer layer and exposed to, for example, ambient air. The first layer 46 may have any suitable thickness such as, for example, approximately 0.55 mils or between about 0.40 mils and 0.70 mils. The first layer 46 may be made of a thermoplastic material such as, poly(cyclohexylene dimethylene cyclohexanedicarboxylate), (PCCE). The tie layer 48 may be RF-responsive and may act as a binding layer between the first layer 46 and the second layer 50. The tie layer 48 may have any suitable thickness such as, for example, approximately 0.4 mils or between about 0.25 mils and 0.55 mils. In some examples, the thickness of the tie layer 48 may vary. For example, if the tie layer 48 has a thickness of approximately 0.4 mils, the tie layer 48 may be made of a plastic material such as ethyl vinyl acetate (EVA) modified with malic anhydride.

The second layer 50 may be made of a RF-response layer or material such as, for example, ethyl vinyl acetate (EVA), that cooperates with the inner layer 52 and the mesh strip 18 to form and/or create the peelable seal 16 as described below. The second layer 50 may have any suitable thickness such as, for example, 6.2 mils or between about 5.75 mils and 6.75 mils. In some examples, the thickness of the second layer 50 may vary.

The inner layer 52 may be made of a non-RF responsive material. In some examples, the inner layer 52 may be a non-RF-responsive alloy of styrene-ethylene-butyl-styrene (SEBS) such as, for example, Kraton®, and ethylene polypropylene copolymer. In such examples, the inner layer 52 may have a thickness of approximately 1.6 mils or between about 1.40 mils and 1.80 mils.

As described above, the mesh strip 18 may be any suitable material that is compatible with the contents to be contained in the first and/or second compartments 12 and 14. Additionally, if the first and second sheets 20 and 22 are implemented using the multilayer sheet 44, the mesh strip 18 the may be any suitable material that has a melting point that is relatively greater than at least the melting point of the inner layer 52. Alternatively, if the first and second sheets 20 and 22 are implemented using single layer sheets made of, for example, a PVC material (e.g., polyvinyl chloride), the mesh strip 18 may be any suitable material that has a melting point that is relatively greater than at least the melting point of the single layer sheet. In particular, in some examples, the mesh strip 18 may be made of a PET material (e.g., polyethylene terephthalate) or a plastic material. Typically, PET has a higher melting point as compared to many plastics such as, for example, the first and second sheets 20 and 22 made of a PVC material and/or the inner layer 52

The mesh strip 18 may be relatively wider than the peelable seal 16 to enable a die bar, utilized to form the peelable seal 16, to variably engage the container 10 between edges 102 and 104 of the mesh strip 18 and still form the peelable seal 16. As depicted in FIG. 1, a width 106 of the mesh strip 18 is approximately 0.68 inches and a width 108 of the peelable seal is approximately 0.26 inches. In other examples, the mesh strip 18 may have a width of between about 0.5 inches and 0.8 inches and the peelable seal 16 may have a width of between about 0.2 inches and 0.3 inches.

Edges 110 and 112 of the mesh strip 18 may be positioned at a distance from (e.g., does not extend completely to) the first and second longitudinal edges 24 and 26. Similarly, while not shown, if the mesh strip 18 were to be positioned between the first and second lateral edges 28 and 30, the edges 110 and 112 of the mesh strip 18 may be positioned at a distance from (e.g., does not extend completely to) the first and second lateral edges 28 and 30. Such an approach substantially prevents the mesh strip 18 from interfering with or weakening peripheral seals formed along the edges 24, 26, 28 and 30. Additionally or alternatively, the mesh strip 18 may define an aperture (not shown) adjacent each or one of the edges 110 and/or 112 to substantially secure the mesh strip 18 relative to at least one of the sheets 20 and/or 22 even after the peelable seal 16 is broken and/or opened. In operation, pressure and heat applied to the first and second sheets 20 and 22 (e.g., plastic forming sheets), as described below, causes the first and second sheets 20 and 22 to at least partially melt and flow through the aperture(s) of the mesh strip 18. As the melted material (e.g., plastic) cools, the first and second sheets 20 and 22 fuse and/or form a substantially non-peelable seal through the aperture(s). Such an approach substantially prevents the mesh strip 18 from, for example, floating in the fluid contained in either the first and/or second compartments 12 and/or 14 once the peelable seal 16 is broken and/or opened.

Turning to FIG. 4, the pores 42 may be sized to achieve desired opening characteristics of the peelable seal 16. Generally, the larger the size of the pores 42, the larger the amount of force will be required to break and/or open the peelable seal 16 to fluidly couple the first compartment 12 and the second compartment 14. In some examples, each of the pores 42 may be between about eleven micrometers and fifty micrometers. As depicted in FIG. 4, the pores 42 may be approximately thirty micrometers, which enables the peelable seal 16 to withstand a six foot drop test of the container 10 filled approximately three-quarters full with fluid without opening and/or leaking.

In some examples, the peelable seal 16 may be formed by a direct heat sealing method or a RF sealing method. To form the peelable seal 16 on the container 10 using either of the above methods, initially the mesh strip 18 is positioned between the first and second sheets 20 and 22 (e.g., polymeric sheets) at a location at which the peelable seal 16 is to be formed. A die bar (e.g., a profiled die bar) (not shown) then urges the first and second sheets 20 and 22 against the mesh strip 18 such that, for example, the peelable seal 16 is formed at approximately the midpoint (e.g., between the edges 102 and 104) of the mesh strip 18. Generally, the die bar may be preheated to a temperature less than the required sealing temperature (e.g., the temperature required to form the peelable seal 16). Once the die bar urges the first and second sheets 20 and 22 against the mesh strip 18, the die bar may be energized with, for example, heat energy or RF energy, to heat the first and second sheets 20 and 22 to at least the melting point of, for example, PVC or any other plastic material used for the inner layer 52 and/or the first and/or second sheets 20 and 22. In some examples, the die bar may be energized with sufficient RF energy to raise the temperature to approximately 120° C., which is a temperature greater than the melting point of the first and second sheets 20 and 22 if the first and second sheets 20 and 22 are made of a PVC material. The size and/or shape of the die bar utilized to form the peelable seal 16 impacts the size and/or shape of the peelable seal 16. For example, if a profiled die bar is utilized to form the peelable seal 16, the peelable seal 16 may be generally straight and rectangular.

In operation, the heat and pressure applied by the die bar to the first and second sheets 20 and 22 (e.g., plastic forming sheets) causes the first and second sheets 20 and 22 to at least partially melt and flow through the pores 42 of the mesh strip 18. As the melted material (e.g., plastic) cools, the first and second sheets 20 and 22 fuse and/or form relatively strong bonds through the pores 42. However, the placement of the interwoven strands 40 adjacent the pores 42 interrupt the fusing between the first and second sheets 20 and 22 to enable the peelable seal 16 to be broken and/or opened by purposefully manipulating the container 10 even if complete melting and/or fusing occurs between the first and second sheets 20 and 22. Such an approach decreases the temperature control requirements to produce peelable seals 16 having substantially consistent opening characteristics, which eliminates the limitations encountered by the prior art. However, in other examples, a strength of the peelable seal 16 may be such that the container 10 may be squeezed in an apparatus or mechanical aid to enable the peelable seal 16 to be broken and/or opened. In such examples, the pores 42 may be relatively large to obtain the desired strength of the peelable seal 16.

Figure 6:
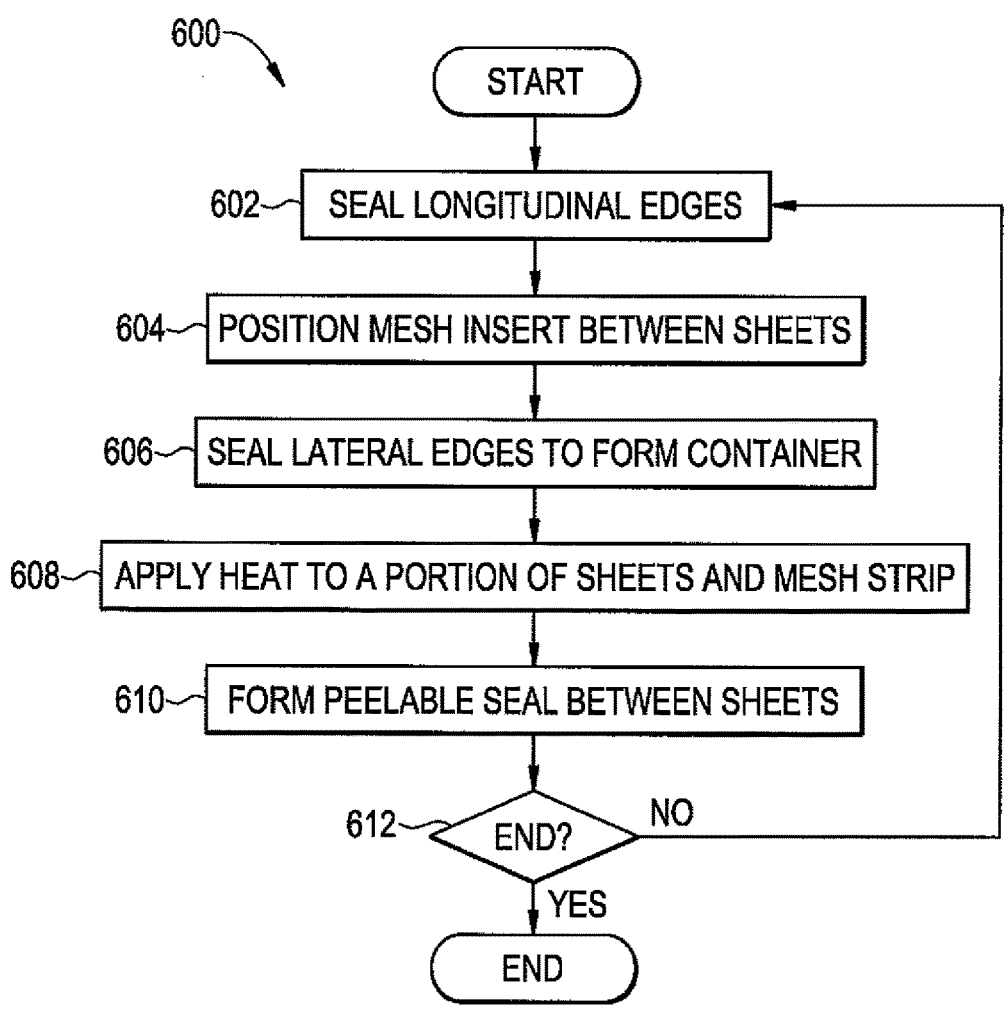
FIG. 6 is a flow diagram representative of example machine readable instructions that may be executed to produce a container having a peelable seal.

The flow diagram depicted in FIG. 6 is representative of machine readable instructions that can be executed to produce the example apparatus described herein. In particular, FIG. 6 depicts a flow diagram representative of machine readable instructions that may be executed to produce, for example, the peelable seal 16, the container 10 or any other of the examples described herein. The example process of FIG. 6 may be performed using a processor, a controller and/or any other suitable processing device. For example, the example processes of FIG. 6 may be implemented in coded instructions stored on a tangible medium such as a flash memory, a read-only memory (ROM) and/or random-access memory (RAM) associated with a processor. Alternatively, some or all of the example processes of FIG. 6 may be implemented using any combination(s) of application specific integrated circuits) (ASIC(s)), programmable logic device(s) (PLD(s)), field programmable logic device(s) (FPLD(s)), discrete logic, hardware, firmware, etc. Also, some or all of the example processes of FIG. 6 may be implemented manually or as any combination(s) of any of the foregoing techniques, for example, any combination of firmware, software, discrete logic and/or hardware. Further, although the example processes of FIG. 6 are described with reference to the flow diagram of FIG. 6 other methods of implementing the processes of FIG. 6 may be employed. For example, the order of execution of the blocks may be changed, and/or some of the blocks described may be changed, eliminated, sub-divided, or combined. Additionally, any or all of the example processes of FIG. 6 may be performed sequentially and/or in parallel by, for example, separate processing threads, processors, devices, discrete logic, circuits, etc.

FIG. 6 depicts an example method 600 that may be used to produce the container 10 having the peelable seal 16. To do so, in some examples, initially, the first and second longitudinal edges 24 and 26 may be heat sealed (block 602) and then an operator may position the mesh strip 18 between the first and second sheets 20 and 22 (e.g., polymeric sheets) (block 604) at a location at which the peelable seal 16 is to be formed. The mesh strip 18 may include the plurality of interwoven strands 40 and the pores 42 adjacent the plurality of interwoven strands 40. The first and second lateral edges 28 and 30 may then be heat sealed to form the container 10 (block 606) and to substantially prevent fluid from leaking out between the respective edges 24, 26, 28 and 30. Next, in some examples, the die bar (not shown) then urges the first and second sheets 20 and 22 against the mesh strip 18 at which point the die bar is energized with, for example, heat energy or RF energy, to heat the first and second sheets 20 and 22 and the mesh strip 18 (block 608) to at least the melting point of, for example, the inner layer 52 and/or the first and/or second sheets 20 and 22 to form the peelable seal between the sheets 20 and 22 (block 610).

The heat and pressure applied by the die bar to the first and second sheets 20 and 22 (e.g., plastic forming sheets) causes the first and second sheets 20 and 22 to at least partially melt and flow through the pores 42 of the mesh strip 18. As the melted material (e.g., plastic) cools, the first and second sheets 20 and 22 fuse and/or form relatively strong bonds through the pores 42. However, the placement of the interwoven strands 40 adjacent the pores 42 interrupt the fusing between the first and second sheets 20 and 22 to enable the peelable seal 16 to be broken and/or opened by purposefully manipulating the container 10 even if complete melting and/or fusing occurs between the first and second sheets 20 and 22.

The method 600 then determines whether it should seal corresponding longitudinal edges of other sheets (block 612). Otherwise, the example process of FIG. 6 is ended.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

The invention claimed is:

1. A method of producing a container having a peelable seal, comprising: sealing to each other a first set of opposed edges of a first sheet and a second sheet; providing a mesh insert having first and second ends and an aperture adjacent one or both of the first and second ends; positioning the mesh insert between the first sheet and the second sheet with the ends being spaced a distance from the sealed opposed edges, wherein the mesh insert comprises: a plurality of interwoven strands; and a plurality of pores adjacent the interwoven strands; sealing to each other a second set of opposed edges of the first sheet and the second sheet to form the container; and applying heat to a portion of the first sheet, the second sheet, and the mesh insert to form a peelable seal between the first sheet and the second sheet through the mesh insert and a non-peelable seal between the first sheet and the second sheet through the aperture.

2. The method as defined in claim 1, wherein forming the peelable seal between the first sheet and the second sheet comprises fusing the first sheet and the second sheet through at least some of the plurality of pores.

3. The method as defined in claim 1, wherein applying heat to the portion of the first sheet, the second sheet, and the mesh insert comprises applying RF-energy to the portion of the first sheet, the second sheet, and the mesh insert.

4. A method of producing a container having a peelable seal comprising: i) providing first and second sheets each having at least first and second sets of opposed edges; ii) providing a mesh insert having first and second ends and an aperture adjacent one or both of the first and second ends; iii) positioning the mesh insert between the first sheet and the second sheet with the first and second ends of the mesh insert being spaced from one of the first and second sets of opposed edges; iv) urging the first sheet and the second sheet against the mesh insert; v) applying energy to the first and second sets of opposed edges to form the container and to a portion of the first sheet, the second sheet, and the mesh insert to form a peelable seal between the first sheet and the second sheet through the mesh insert and a non-peelable seal between the first sheet and the second sheet through the aperture.

5. The method of claim 4, wherein forming the peelable seal between the first sheet and the second sheet comprises fusing the first sheet and the second sheet through at least some of the plurality of pores.

6. The method of claim 4, wherein applying energy to the portion of the first sheet, the second sheet, and the mesh insert comprises applying RF-energy to the portion of the first sheet, the second sheet, and the mesh insert.

* * * * *